Figure 1:
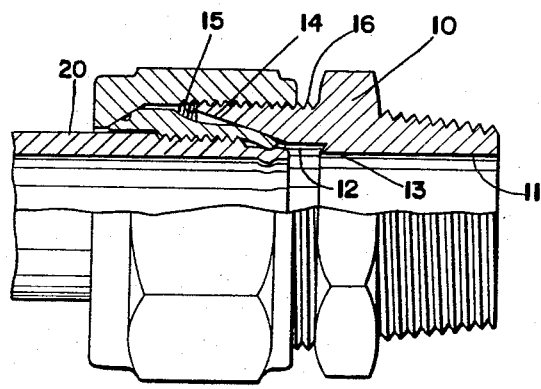

June 20, 1967     W. E. CURRIE     3,326,582

TUBE COUPLING

Filed Nov. 17, 1964

INVENTOR.
WILLIAM E. CURRIE

BY John N. Wolfram
ATTORNEY

United States Patent Office 3,326,582
Patented June 20, 1967

3,326,582
TUBE COUPLING
William E. Currie, Cleveland Heights, Ohio, assignor to Parker-Hannifin Corporation, Cleveland, Ohio, a corporation of Ohio
Filed Nov. 17, 1964, Ser. No. 411,894
6 Claims. (Cl. 285—341)

This invention relates to tube couplings and more particularly to couplings for high pressure in which a ferrule is anchored onto an unflared tube and the ferrule having a portion deformable by the coupling members into sealing engagement with the tube.

Tubing for high fluid pressures must either have a thick wall to withstand the high pressure or must be made of hard materials, or both. In either case, the tube is difficult to flare for making a coupling joint and therefore it is desirable to provide some other means of gripping the tube. One heretofore proposed method has been to thread the tube and form a seat at the end of the tube and then threading a collar thereon that is engageable with a nut for clamping the tube seat against a seat in the coupling body.

Disadvantages in the latter type of coupling are that the seat on the tube must be accurately spaced relative to the thread and must be square across the tube so that it will properly contact the body seat. The tube seat must be free of machining imperfections and must be maintained free of nicks and other damage during handling. Also, there must be some means of accurately locating the collar upon the thread so that the coupling parts will cause the tube seat to properly engage the body seat for sealing the joint.

It is an object of the present invention to provide a high pressure joint in which the ferrule is threaded upon the body but in which the endwise seat on the tube is omitted and the ferrule merely contracts radially into sealing engagement with a cylindrical portion of the tube.

It is another object to provide a coupling of the type described in which the ferrule is a continuous annulus having a thread at its midsection and having deformable sealing and vibration dampening portions at its opposite ends for contraction into sealing and vibration dampening engagement with the tube.

It is another object to provide a coupling of the type described in which a ferrule threaded onto a tube has a portion in advance of the threaded section that is deformable into sealing engagement with the tube and in which at least the first part of the threaded section is of thin cross section to facilitate such deformation and which is also radially deformable to increase the tightness of the threaded engagement.

Another object is to provide a coupling of the type described in which the threaded ferrule has a deformable sealing portion in advance of the threaded section and the outer surface of the threaded section is of smaller diameter throughout a substantial portion of its length for clearing a tapered opening in the coupling body that engages the deformable portion of the ferrule for contracting it into sealing engagement with the tube.

Figure 2:
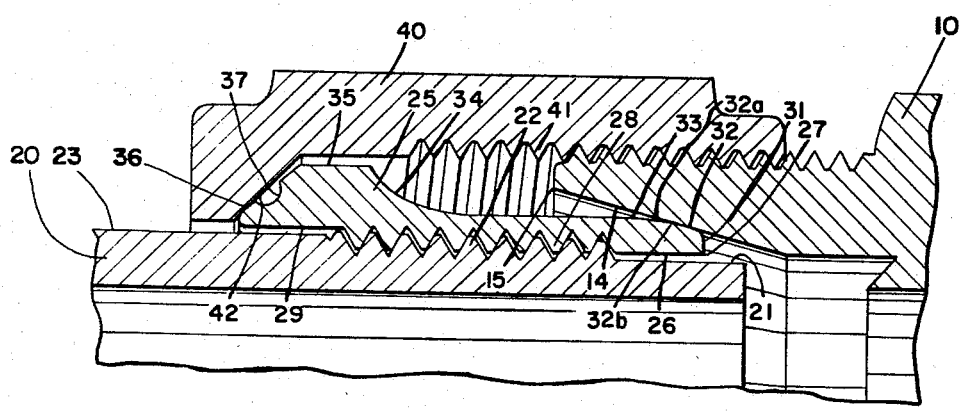
Figure 3:
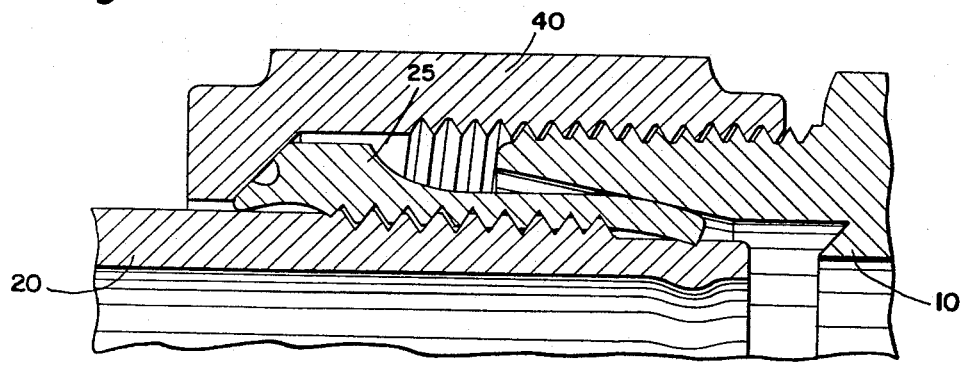

Other objects of the invention will be apparent from the following description and claims and from the drawing in which:

FIGURE 1 is a view partly in longitudinal section of the assembled tube coupling joint, FIGURE 2 is an enlarged fragmentary section view showing the coupling parts in loosely assembled position, and FIGURE 3 is an enlarged fragmentary section view showing the coupling parts tightly assembled.

The complete joint includes a body member 10 having a bore 11 and a counterbore 12 with a tapered shoulder 13 therebetween. This shoulder 13 has no function in the form of coupling illustrated but is provided for making the body interchangeable with other forms of couplings.

Flaring outwardly from counterbore 12 is a tapered annular wall 14 terminating in an outer corner 15 and the body has an external thread 16.

The joint includes a tube 20 having an outer cylindrical surface 21 of substantial length at its inner end followed by an external thread 22. The major diameter of external thread 22 is substantially the same as the outer diameter 23 of the tube and the cylindrical surface 21 is substantially the same diameter as the root diameter of external thread 22 but is preferably just slightly smaller than the same so that it will be a smooth surface devoid of marks from the chasers used in forming external thread 22.

Threaded onto tube 20 is a ferrule 25 having a smooth inner cylindrical surface 26 terminating at its front end in a sharp corner 27 and having its inner end adjacent an internal thread 28. Threads 22, 28 are preferably straight and left handed, although in some forms of the invention they may be tapered and/or may be right handed.

Adjacent the rear end of thread 28 the ferrule has a smooth walled cylindrical counterbore 29 slightly larger in diameter than outside diameter 23 of the tube and also either substantially the same as or slightly larger than the major diameter of thread 28.

The front end surface 31 of the ferrule is preferably at about 90° to inner cylindrical surface 26 and intersects a short tapered surface 32 on the ferrule whose taper initially corresponds with the taper of body wall 14, which is at about 15° with the longitudinal axis of the coupling. Adjacent tapered portion 32 the ferrule has another short surface 32a having about a 7½° taper and which merges with an outer cylindrical surface 33 that extends opposite a portion of threads 28 and which merges with a concavely curved surface 34 that intersects a cylindrical surface 35 of relatively large diameter in the vicinity of the juncture of internal thread 28 with cylindrical wall 29. Cylindrical surface 35 is relatively large in diameter so as to provide a relatively thin cross section where inner cylindrical surface 26 meets internal thread 28. The outer end of the ferrule has a tapered face 36 that is intersected by an annular groove 37.

A nut 40 has an internal thread 41 for engagement with body thread 16, although if desired this threaded connection can be omitted and members 10 and 40 provided with bolt holes through which bolts can be extended for drawing the members together. Nut member 40 has a tapered shoulder 42 engageable with the end of the ferrule for moving the ferrule toward body member 10.

In making up the joint, nut 40 is first slipped over tube 20 and ferrule 25 is then threaded onto the tube to the position shown in FIGURE 2. In this position, end face 31 of the ferrule is spaced from the end of the tube as shown and inner cylindrical surface 26 and inner wall 29 have slight clearances with outer cylindrical surface 21 and the outer wall 23 of the tube, respectively. Tapered surface 32 of the ferrule engages body wall 14 at a location spaced inwardly of body outer corner 15.

Upon tightening of nut 40 upon body member 10, nut shoulder 42 moves ferrule 25 further into body member 10 and tapered wall 14 causes the forward end of the ferrule to radially contract into sealing engagement with tube outer cylindrical surface 21, such sealing engagement being provided both at sharp corner 27 and the adjacent portion of inner cylindrical surface 26. As the front end of the ferrule contracts it tends to curl or bow inward slightly, causing the circular line of intersection 32b between surfaces 32 and 32a to press into tighter sealing engagement with wall 14 so as to approach a line type sealing contact. Further tightening will bring surface 32a into contact with wall 14 to prevent any appreciable gauging of line 32b into wall 14. During such forward motion of the ferrule, the tube 20 will also move forward further into body 10 because of its threaded engagement with ferrule 25. Because of its thin section, the portion of the ferrule opposite the first few internal threads 28 will also radially contract to make these internal threads a tight fit about the threads on the tube which they engage, as may be seen in FIGURE 3.

As nut 40 moves ferrule 25 into its tightened position, the rear portion of the ferrule also radially contracts because of the tapered faces 36 and 42 so that the outer end of cylindrical wall 29 tightly grips the outer wall 23 of the tube for dampening external vibrations of the tube. The thick cross section of the ferrule at the juncture of cylindrical wall 29 with internal thread 28 prevents outward buckling of the ferrule that would result in loss of engagement of threads 28 in this region with the thread on the tube. Also, as will be observed in FIGURE 3, the concave curved outer surface 34 of the ferrule permits entry of the ferrule into tapered opening 14 for a considerable distance without having corner 15 of the body butt into the thick end of the ferrule with consequent increased resistance to further travel. When threads 16, 41 are utilized in lieu of bolts, they are preferably right handed when threads 22, 28 are left handed so that any turning friction of nut 40 upon the ferrule will tend to thread the ferrule further onto the tube as the nut is being threaded onto body 10. Thread 22 is formed only for a predetermined distance upon the tube so that when ferrule 25 is threaded thereupon as far as it will go the end surface 31 of the ferrule will be intermediate the ends of cylindrical outer surface 21 of the tube. The latter is of material length so that the parts need not be formed or threaded to close tolerances to insure that ferrule end surface 31 will be intermediate the ends of cylindrical surface 21 when the ferrule is threaded onto the tube as far as it will go.

I claim:

1. A tube coupling joint comprising a tube having an external thread spaced from an inner end of the tube and a smooth cylindrical outer surface of smaller diameter than the root diameter of the thread extending from the thread to said inner end of the tube, a body member having an opening with a tapered wall, a ferrule having a smooth cylindrical inner surface at its inner end threaded onto the tube with its inner end opposite said outer surface and engageable with said tapered wall, a clamping member threadably secured to the body member and engageable with the other end of the ferrule for moving the ferrule and tube toward the body member whereby said inner end of the ferrule is contracted by the tapered wall into sealing engagement with said outer surface, said tube having an initial endwise clearance with said body member whereby said tube may move freely toward said body with said ferrule.

2. The joint of claim 1 in which the diameter of said smooth cylindrical inner surface before contraction is substantially the same diameter as the crest diameter of the thread in the ferrule.

3. The joint of claim 1 in which the ferrule has a cross section radially opposite the roots of its innermost threads that is thinner than the cross section thickness opposite the adjacent portion of said smooth cylindrical inner surface to facilitate said contraction of said inner end of the ferrule.

4. A tube coupling joint comprising a body member having an opening with a tapered wall, a tube having a smooth outer cylindrical surface adjacent one end thereof followed by an external thread whose root diameter is approximately the same as that of the outer cylindrical surface, the tube having a smooth outer cylindrical wall adjacent the thread and of a diameter no less than the major diameter of the thread, a ferrule having an internal thread engaged with and of substantially the same length as said external thread and having an internal cylindrical surface at one end thereof forward of said internal thread and of a diameter substantially the same as the crest diameter of said internal thread, said ferrule having a smooth cylindrical inner wall at its opposite end of a diameter substantially the same as the major diameter of said internal thread, said ferrule having a tapered outer face radially opposite said inner wall, a clamping member adjustably secured to the body member for movement toward said opening, said clamping member having a shoulder engageable with said tapered outer face for moving the ferrule toward said body member whereby said one end of the ferrule engages said tapered wall of the body member and is radially contracted thereby for causing the cylindrical inner wall of the ferrule to sealingly engage the outer cylindrical surface of the tube whereby the opposite end of the ferrule is contracted for causing said cylindrical inner wall to engage said outer cylindrical wall of the tube.

5. The joint of claim 4 in which said ferrule is sufficiently thin in cross section at the forward end of said internal thread whereby contraction of said one end of the ferrule also contracts a portion of the internal thread upon the engaged external thread.

6. An article of manufacture comprising a ferrule having a smooth continuous inner cylindrical surface at one end followed by an internal thread whose minor diameter is substantially the same as the diameter of said inner surface, said ferrule being adapted to be threaded on a tube having an externally threaded portion and a cylindrical end portion adjacent the threaded portion, the diameter of the cylindrical end portion being substantially the same as the root diameter of the thread of the tube, said ferrule being of ductile material whereby said one end may be radially contracted by a coupling member for causing said surface to sealingly engage a tube extending through the ferrule, said ferrule having a substantially uniform outer diameter opposite adjacent portions of the thread and inner surface whereby the cross-section of the ferrule opposite the thread roots of said adjacent thread portion is thinner than the cross-section of the ferrule opposite said adjacent portion of said surface to facilitate said contraction, and said ferrule having another smooth continuous inner cylindrical surface at its opposite end of a diameter substantially the same as the major diameter of the thread on the ferrule, and said ferrule also having an enlarged head opposite said another surface and an adjacent portion of the ferrule thread.

References Cited

UNITED STATES PATENTS

| | | | |
|---|---|---|---|
| 1,163,679 | 12/1915 | Mueller | 285—342 X |
| 1,949,839 | 3/1934 | Ellis | 285—341 X |
| 2,473,118 | 6/1949 | Wolfram | 285—342 |
| 2,496,510 | 2/1950 | Wolfram | 285—382.7 X |
| 2,791,452 | 5/1957 | Watson | 285—342 |
| 2,826,438 | 3/1958 | Woodling | 285—382.7 X |
| 2,946,607 | 7/1960 | Bauer | 285—382.7 X |
| 3,003,795 | 10/1961 | Lyon | 285—382.7 |

FOREIGN PATENTS 1,101,839  4/1955  France.

CARL W. TOMLIN, *Primary Examiner.*

THOMAS F. CALLAGHAN, *Examiner.*